United States Patent
Seifert et al.

(10) Patent No.: US 10,102,379 B1
(45) Date of Patent: Oct. 16, 2018

(54) REAL-TIME EVALUATION OF IMPACT- AND STATE-OF-COMPROMISE DUE TO VULNERABILITIES DESCRIBED IN ENTERPRISE THREAT DETECTION SECURITY NOTES

(71) Applicant: SAP SE, Walldorf (DE)

(72) Inventors: Hartwig Seifert, Elchesheim-Illingen (DE); Nan Zhang, Schriesheim (DE); Harish Mehta, Wiesenbach (DE); Florian Chrosziel, St. Leon-Rot (DE); Hristina Dinkova, Nussloch (DE); Thomas Kunz, Lobbach/Lobenfeld (DE); Lin Luo, Wiesloch (DE); Rita Merkel, Ilvesheim (DE); Wei-Guo Peng, Dallau (DE); Eugen Pritzkau, Wiesloch (DE); Marco Rodeck, Maikammer (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/639,860

(22) Filed: Jun. 30, 2017

(51) Int. Cl.
*H04L 29/06* (2006.01)
*G06F 21/57* (2013.01)
*G06F 8/65* (2018.01)

(52) U.S. Cl.
CPC .............. *G06F 21/577* (2013.01); *G06F 8/65* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 7,380,205 B2 | 5/2008 | Bezrukov et al. | |
| 7,457,792 B2 | 11/2008 | Weigt et al. | |
| 7,457,793 B2 | 11/2008 | Weigt et al. | |
| 7,457,794 B2 | 11/2008 | Weigt et al. | |
| 7,624,092 B2 | 11/2009 | Lieske et al. | |
| 7,756,808 B2 | 7/2010 | Weigt et al. | |
| 7,756,809 B2 | 7/2010 | Weigt et al. | |
| 7,761,396 B2 | 7/2010 | Weigt et al. | |
| 7,783,723 B2 | 8/2010 | Peng et al. | |
| 7,788,718 B1 * | 8/2010 | Fei | H04L 63/1458 726/14 |
| 7,971,209 B2 | 6/2011 | Eberlein et al. | |
| 8,051,034 B2 | 11/2011 | Mehta et al. | |
| 8,661,103 B2 | 2/2014 | Mehta et al. | |

(Continued)

OTHER PUBLICATIONS

Schumacher, Markus, "An effective way to bring SAP Security Notes under control", Feb. 24, 2017, Virtual Forge GmbH, https://blog.virtualforge.com/en/an-effective-way-to-bring-sap-security-notes-under-control, p. 1-4.*

*Primary Examiner* — Jeffery Williams
(74) *Attorney, Agent, or Firm* — Fish & Richardson P.C.

(57) ABSTRACT

Published enterprise threat detection (ETD) security notes are accessed in a computer data store. Applicability of the published ETD security notes are determined for an information technology computing (IT) landscape. A determination is made that a particular applicable ETD security note has not yet been implemented in the IT computing landscape. Aggregated impact of compromise (IoC) and state of compromise (SoC) values associated with the published ETD security note are analyzed and a computing system patching action is performed based on the aggregated IoC and SoC values.

20 Claims, 11 Drawing Sheets

(56) References Cited

U.S. PATENT DOCUMENTS

| | | |
|---|---|---|
| 8,775,671 B2 | 7/2014 | Rodeck et al. |
| 8,892,454 B2 | 11/2014 | Rabetge et al. |
| 8,954,602 B2 | 2/2015 | Seifert et al. |
| 9,037,678 B2 | 5/2015 | Mehta et al. |
| 9,075,633 B2 | 7/2015 | Nos |
| 9,116,906 B2 | 8/2015 | Nos et al. |
| 9,148,488 B2 | 9/2015 | Rabetge et al. |
| 9,251,011 B2 | 2/2016 | Meier et al. |
| 9,304,978 B2 | 4/2016 | Bezrukov et al. |
| 9,348,665 B2 | 5/2016 | Storz et al. |
| 2007/0073519 A1* | 3/2007 | Long .................. G06F 11/3636 702/185 |
| 2011/0277034 A1* | 11/2011 | Hanson ................ G06F 21/554 726/25 |
| 2013/0304665 A1 | 11/2013 | Rodeck et al. |
| 2013/0304666 A1 | 11/2013 | Rodeck et al. |
| 2013/0326079 A1 | 12/2013 | Seifert et al. |
| 2017/0034023 A1* | 2/2017 | Nickolov ............ H04L 43/0817 |
| 2017/0169217 A1* | 6/2017 | Rahaman .............. G06F 21/554 |
| 2017/0324766 A1* | 11/2017 | Gonzalez Granadillo .................. H04L 63/1441 |

\* cited by examiner

FIG. 5

ENTERPRISE THREAT DETECTION: SYSTEM CONTEXT — SMITH

SYSTEM OVERVIEW | SYSTEM INFORMATION | FURTHER DETAILS

SYSTEM Y3Y
XYZ

☐ SAVE CHANGES   ↻ RESET CHANGES

GENERAL
- ROLE: TEST
- STATUS: ACTIVE
- LOCATION:
- SYSTEM GROUP: Y3Y / XYZ

TECHNICAL DETAILS
- USAGE TYPE:
- LANDSCAPE:
- LANDSCAPE DESCRIPTION:
- DATABASE HOST: id3983
- DATABASE TYPE: MaxDB
- DATABASE VERSION: 7.8.02.042

BUSINESS SIGNIFICANCE — 502
- CONFIDENTIALITY: MEDIUM
- INTEGRITY SYSTEM: VERY HIGH
- INTEGRITY DATA: HIGH
- AVAILABILITY: LOW

CONTACTS
- LINE OF BUSINESS:
- BUSINESS CONTACT NAME:
- BUSINESS CONTACT TELEPHONE NUMBER:
- BUSINESS CONTACT E-MAIL ADDRESS:
- TECHNICAL CONTACT NAME:
- TECHNICAL CONTACT TELEPHONE NUMBER:
- TECHNICAL CONTACT E-MAIL ADDRESS:

APPLICATION SERVERS

| HOST | OPERATION SYSTEM | OPERATION SYSTEM V... | KERNEL VERSION | KERNEL PATCH LEVEL | IP ADDRESS V4 |
|---|---|---|---|---|---|

FIG. 6A

REAL-TIME EVALUATION OF IMPACT- AND STATE-OF-COMPROMISE DUE TO VULNERABILITIES DESCRIBED IN ENTERPRISE THREAT DETECTION SECURITY NOTES

CROSS REFERENCE TO RELATED APPLICATIONS

This application is related to and filed in conjunction with U.S. patent application Ser. No. 15/639,863, filed on Jun. 30, 2017, entitled "CALCULATION AND VISUALIZATION OF SECURITY RISKS IN ENTERPRISE THREAT DETECTION", the entire contents of which are hereby incorporated by reference.

BACKGROUND

Enterprise threat detection (ETD) typically collects and stores a large amount/large sets of log data associated with various systems (often referred to as "big data") associated with an enterprise computing system. The stored data can be analyzed computationally using forensic-type data analysis tools to identify security risks in revealed patterns, trends, interactions, and associations, especially relating to ETD behavior. Appropriate responses can then be taken if anomalous behavior is suspected or identified. Given the amount/size of the stored data and possible multiple attributes or dimensions the stored data, it can be difficult for a user to determine relevant data (or, conversely, filter out unrelated data) when attempting to evaluate an impact of and present an evaluation for a security risk due to vulnerabilities described in ETD security notes.

SUMMARY

The present disclosure describes real-time evaluation of impact- and state-of-compromise due to vulnerabilities described in enterprise threat detection (ETD) security notes.

In an implementation, published enterprise threat detection (ETD) security notes are accessed in a computer data store. Applicability of the published ETD security notes are determined for an information technology computing (IT) landscape. A determination is made that a particular applicable ETD security note has not yet been implemented in the IT computing landscape. Aggregated impact of compromise (IoC) and state of compromise (SoC) values associated with the published ETD security note are analyzed and a computing system patching action is performed based on the aggregated IoC and SoC values.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, information technology (IT) administrators can easily monitor through clear visualization of weaknesses/security threats, particularly compromise values (that is, impact- and state-of-compromise values—IoC and SoC, respectively), associated with an ETD security note. Second, given the provided compromise values, the IT administrators can evaluate the impact and probability of compromise on computing system (s) due to vulnerabilities described in the ETD security note. Third, based on the evaluation, IT administrators can prioritize the implementation of the security notes in their IT computing landscape. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

FIG. 5 is an illustration of a screenshot of an example ETD Systems Context GUI, according to an implementation.

FIGS. 6A-6B illustrate screenshots of an example symptom detail GUI in relation to the ETD Security Notes GUI, according to an implementation.

Like reference numbers and designations in the various drawings indicate like elements.

DETAILED DESCRIPTION

Figure 1:
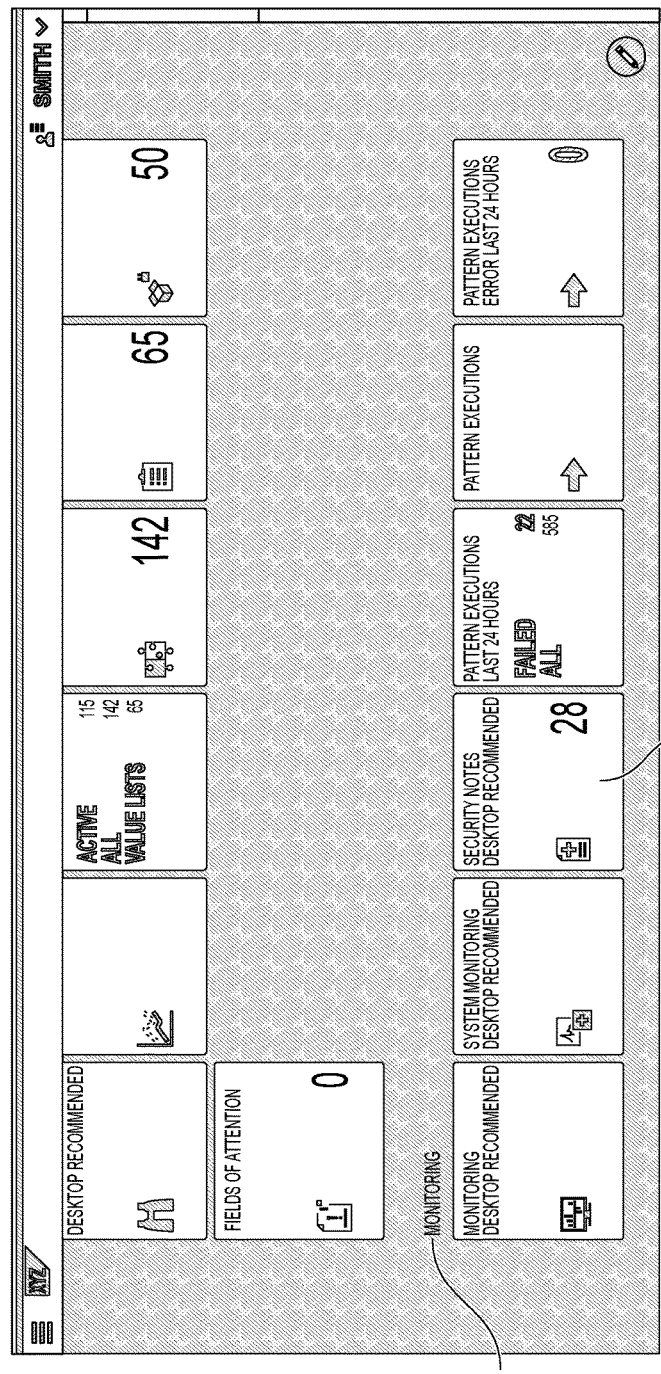
FIG. 1 is an illustration of a screenshot of an example enterprise threat detection (ETD) main group graphical user interface (GUI), according to an implementation.

The following detailed description describes real-time evaluation of impact- and state-of-compromise due to vulnerabilities described in enterprise threat detection (ETD) security notes, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

ETD typically collects and stores a large amount/large sets of log data associated with various systems (often referred to as "big data") associated with an enterprise computing system. The stored data can be analyzed computationally using forensic-type data analysis tools to identify security risks in revealed patterns, trends, interactions, and associations, especially those relating to ETD behavior. Appropriate responses can then be taken if anomalous behavior is suspected or identified.

Published ETD security notes reveal discovered weaknesses/security threats in information technology (IT) computing landscapes. It is the responsibility of IT administrators to monitor and evaluate applicability of the security threats with respect to an IT computing landscape based on information in the ETD security notes, particularly compromise values (that is, impact- and state-of-compromise—IoC and SoC, respectively). The IT administrators must then prioritize and update the IT computing landscape, if deemed appropriate.

Given the amount/size of the stored ETD data and possible multiple attributes or dimensions the stored data, it can be difficult for a user to determine relevant data (or, conversely, filter out unrelated data) when attempting to evaluate an impact of and present an evaluation for a security risk due to vulnerabilities described in ETD security notes. If data evaluation is difficult or cumbersome, IT administrators can lose perspective of, fail to respond to, or respond to security risks in a less-than-optimum manner.

Described is an enhanced graphical user interface (GUI) related to ETD security note evaluation. The GUI enhancements provide an easy-to-understand GUI interface that can quickly draw an IT administrator's attention to important security risks (including single instance attacks) and provide precise analytical results for further analysis in as a transparent and explainable manner as possible.

FIG. 1 is an illustration of a screenshot of an example ETD main group GUI 100, according to an implementation. As illustrated, the ETD main group user interface 100 comprises a plurality of selectable "tiles" segregated into various groups to activate various functions related to ETD. For example, tile 102 is for a "Security Notes" and is in a "Monitoring" group 104. Tile 102 presents information on the tile indicating that there are "28" available ETD security notes for review. It should be noted that the illustrated tiles are for example only. Other functionalities, as understood by one of ordinary skill in the art and consistent with the specification and claims, are also considered to be within the scope of the disclosure. In this example figure, assume that a user has selected tile 102. As a result of the selection, an "XYZ Enterprise Threat Detection: Security Notes" GUI is opened (for example, refer to FIG. 2).

Figure 2:
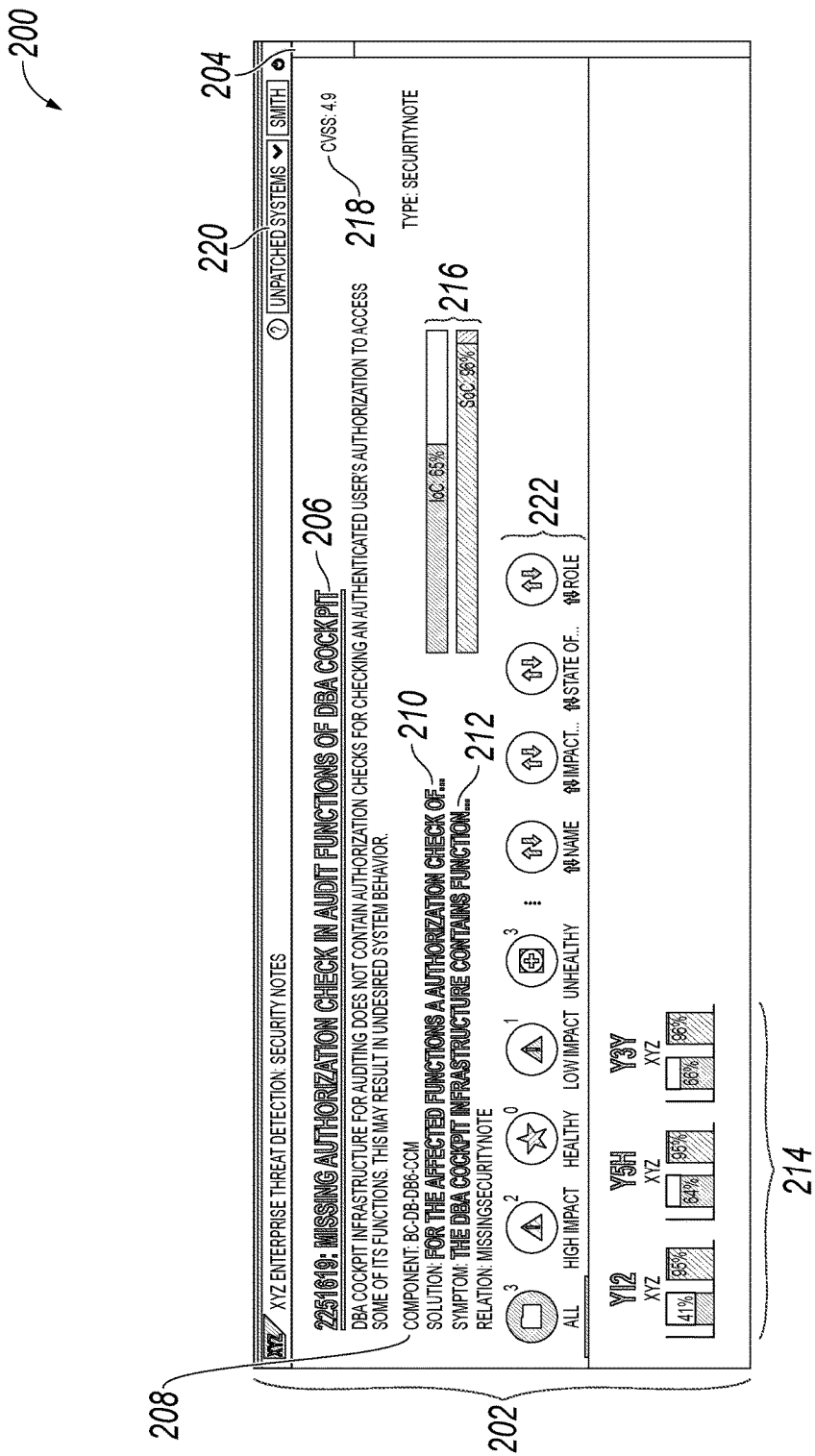
FIG. 2 is an illustration of a screenshot of an example ETD Security Notes GUI, according to an implementation.

FIG. 2 is an illustration of a screenshot of an example ETD Security Notes GUI 200, according to an implementation. As illustrated, GUI 200 includes an example security note 202. While GUI 200 is illustrated with only one visible security note (here, "2251619: Missing authorization check in Audit Functions of DBA Cockpit"), scrollbar 204 shows that GUI 200 can include multiple ETD security notes that can be reached by scrolling up and down within GUI 200.

Security note 202 includes a selectable security note header link 206/description, associated component identifier 208, selectable solution link 210, selectable symptom link 212, computing systems 214 (here, "YI2," "Y5H," and "Y3Y") including the component 208 (for example, component 208 is a software component that is part of each computing system 214), aggregate score values 216, and a common vulnerability scoring system (CVSS) value 218. CVSS is a published standard that provides a way to capture principal characteristics of a particular computing system security vulnerability and to produce a numerical score reflecting its severity. The numerical score can then be translated into a qualitative representation (for example, low, medium, high, and critical) to help organizations properly assess and prioritize vulnerability management processes. When an ETD security note is created, the ETD security note system automatically calculates a CVSS score based on CVSS definitions. GUI 200 also permits selection of unpatched systems, patched systems, and all systems using GUI element 220. Selecting between unpatched, patched, and all systems provides an overview of system and their relevant ETD security notes/implementation state.

Icons 222 can represent (from left to right): 1) all relevant computing systems in the complete system landscape; 2) computing systems impacted at a high-level by the security note; 3) computing systems which are healthy with respect to the note; 4) computing systems impacted at a low-level by the security note; 5) computing systems which are unhealthy with respect to the security note; and 6-10) different scoring of relevant computing systems. Note that icons 2/4 are dependent upon IoC and 3/5 are dependent upon SoC. In GUI 200, the icon 222 for "All" is selected so all computing systems 214 associated with the security note 202 are displayed.

At a high-level, to evaluate security risks in an IT computing landscape (for example, associated with a particular educational, governmental, or business entity), the IT computing landscape is divided and further subdivided into hierarchically-dependent components. The division can be performed in a stepwise manner, considering hierarchical dependency of components, until basic components depending from non-basic components are determined at a granularity that cannot be (meaningfully) divided further into lower-level sub-components of the basic components.

In one implementation, division is performed into components with risk properties including: 1) assignment of a security rating; 2) seen as a target for an attack; or 3) seen as a unit with a potential for security improvement. Once a component cannot be seen as an aggregation of components with at least one of the risk properties above, the component is considered to be at the lowest level possible. For example, a lowest-level component could be a software component running on a server. Moving up the hierarchy, multiple software components on a server could be aggregated to the server, multiple servers could be aggregated to a system, and multiple systems could be aggregated to a system landscape. As another example, a top-level (that is, a highest hierarchical level) component could represent a particular educational entity, sub-components (for example, mid-level) could represent various campuses or departments that make up the educational entity, and lowest-level sub-components could represent various classrooms or instructors associated with the campuses or instructors, respectively. Here, component 208 includes the three identified component computing systems 214.

Figure 3:
FIG. 3 is an illustration of a screenshot of an example ETD Security Notes detail GUI in relation to the ETD Security Notes GUI, according to an implementation.

FIG. 3 is an illustration of a screenshot of an example ETD Security Notes detail GUI 300 in relation to the ETD Security Notes GUI 200, according to an implementation. Selecting the selectable security note header link 206 renders detailed information 302 associated with the security note 202 in the GUI 300. While not illustrated, in typical implementations, the detailed information 302 can be scrolled up and down using the GUI 300.

Figure 4A:
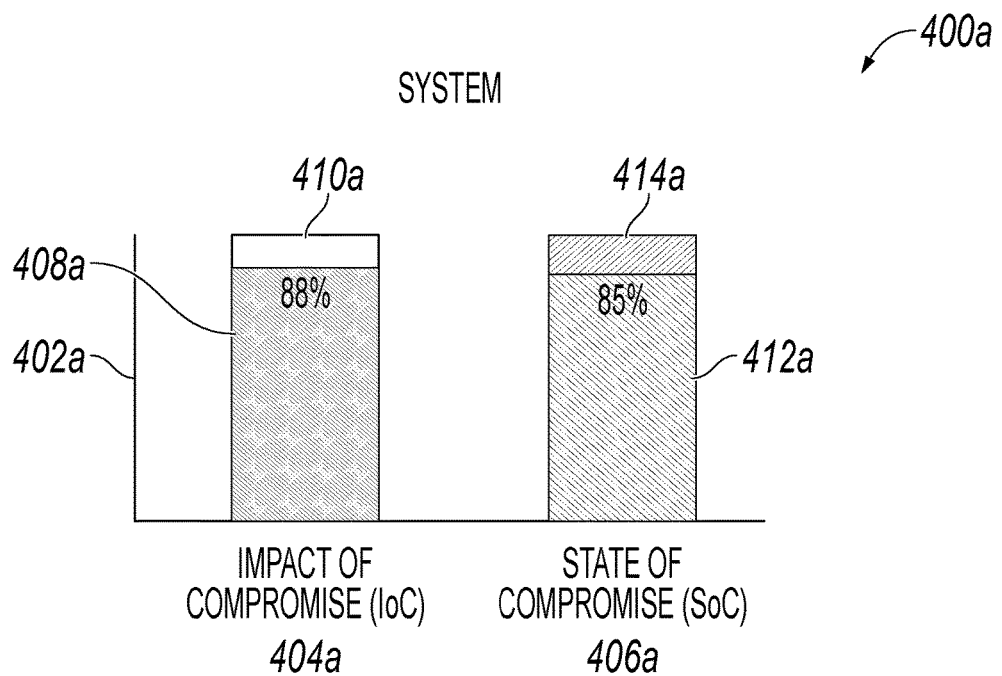
FIG. 4A is a block diagram illustrating calculated impact of compromise (IoC) and state of compromise (SoC) values for a system, according to an implementation.

FIG. 4A is a block diagram 400a illustrating calculated IoC and SoC values (in percentages) for a system (for example, "YI2," "Y5H," or "Y3Y" in FIG. 2), according to an implementation.

Stable factors (for example, that a system is a productive system) contribute to determination of static risk. Static risk determination can typically be performed with background computing processes (for example, not in real-time), as factors used in calculating the static risk seldom change. For example, a static risk factor might include that a particular system in an IT computing landscape is a productive system containing highly sensitive financial data.

In contrast, determination of dynamic risk is based on factors that change in real-time (or substantially real-time) and for which evaluation should be done in real-time (or as close to real time as possible) as the dynamic risk factors can continuously change. For example, a dynamic risk factor can include publication of a security patch for an operating system or software application or available data on current knowledge/exploitation of an existing security leak.

Indicators of compromise can act as important clues for IT administrators monitoring an IT environment. Unusual activity on the network or odd clues on computing systems can frequently help organizations spot attacker activity more quickly so that they can either prevent an eventual breach from happening—or at least stop it in its earliest stages.

Illustrated system 402a is divided into risk indicators representing an IoC and a SoC value (IoC indicator 404a and SoC indicator 406a, respectively). The IoC indicator 404a is static in nature and indicates criticality relating to static indicators of compromise, while SoC indicator 406a is dynamic in nature and indicates exploitability of dynamic indicators of compromise.

For IoC calculations, each system (for example, system 402a) is associated with scores concerning relevance of confidentiality, integrity, and availability (CIA) to the system. In typical implementations, the IoC and SoC are calculated by a database on-the-fly and are not stored. These CIA-related scores are used to determine the IoC value. The IoC for an ETD security note in a specific computing system is calculated from the business significance of the note and the business significance of the computing system. In terms of business significance, confidentiality, and integrity of the computing system and data, and availability are taken into account. For example, ETD security notes with a high impact on confidentiality results in a high IoC score for system with a high-relevance of confidentiality (such as, medical information systems and personal identifying information (PII) storage systems).

For SoC calculations, SoC is calculated based on a number of occurrences of potential security exploits, credibility (for example, not applicable, suspected, and proven), and success (for example, not applicable, undetermined, unsuccessful, and successful) of potential attacks with respect to CIA. The occurrence of the potential exploits can be identified through the indicators which are created as the execution results of ETD patterns. At a high-level, ETD patterns are a series of filters and other data used look for particular events in log data and to raise alerts for further analysis.

With respect to SoC and a number of occurrences, the general idea is that, with an x-axis as the number of occurrences and a y-axis as the SoC, the curve is not linear but increases quickly for small x-values and reaches a maximum value in an asymptotic way. The goal is to reflect that single occurrences of potential attacks can already be severe and to attract an IT administrator's attention for severe attacks that result from a single occurrence.

With respect to IoC and SoC (for credibility/success), a mean value is not used (for example, mean value of (confidentiality (system)*confidentiality (note)+integrity (system)*integrity (note)+availability (system)*availability (note))/3). Instead, maximum values are weighted much higher so that they are not lost. For example, the CIA dimension is by itself important, even if other possible dimensions are not rated as critical.

The IoC indicator 404a and the SoC indicator 406a is associated with a calculated value indicating criticality and exploitability, respectively. For example, IoC indicator 404a has an illustrated value of 88% and the SoC indicator 406a has an illustrated value of 85%. Note that, in some implementation, an indication of "not applicable" (or similar) can be used when a value cannot be calculated (for example, when a system is not assessed with respect to confidentiality, integrity, availability (CIA), or when the usage or vulnerable functionality cannot be determined).

As illustrated in FIG. 4A, a first color 408a (for example, dark blue) can be used for a portion of the IoC indicator 404a column from 0 to the value (here 88%), while a second color 410a (for example, light blue) can be used from the value to 100. Similarly, a third color 412a (for example, red) can be used for a portion of the SoC indicator 406a column from 0 to the value (here 85%), while a fourth color 414a (for example, green) can be used from the value to 100. A fifth color (for example, gray) that is different from the first, second, third, or fourth colors can be used in the case of "not applicable" for both indicator columns.

Figure 4B:
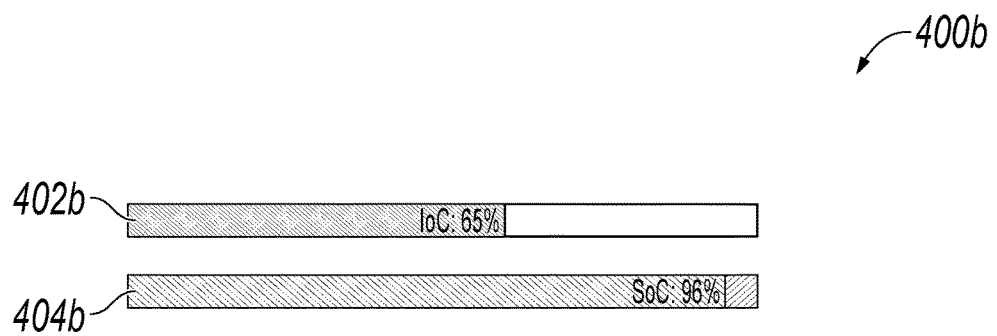
FIG. 4B is a block diagram illustrating calculated aggregated IoC and SoC values for a component, according to an implementation.

FIG. 4B is a block diagram 400b illustrating calculated aggregated IoC and SoC values for a component, according to an implementation. As illustrated, the aggregated IoC value 402b is 65% and the aggregated SoC value 404b is 96%. The aggregation values are based on IoC or SoC values of each computing system in the IT computing landscape including the component. In other words, the IoC values for a single ETD security note and all relevant computing systems are aggregated into a single IoC value for the note. As previously described, a mean value is not used, but maximum values are weighed much higher. The aggregated SoC value is calculated in a similar manner.

FIG. 5 is an illustration of a screenshot of an example ETD Systems Context GUI 500, according to an implementation. In some implementations, a user can reach GUI 500 by navigating to the main group GUI 100 (refer to FIG. 1), selecting a "Systems" tile, and selecting a particular system (for example, XYZ System Y3Y) to view contextual data. With respect to the previous discussion, business significance data 502 provides contextual data with respect to CIA values. For example, System Y3Y has a Confidentiality value of "Medium," Integrity System value of "Very High," Integrity Data value of "High," and Availability value of "Low." These contextual values are used in calculation of IoC and SoC credibility/success values.

Figure 6A:
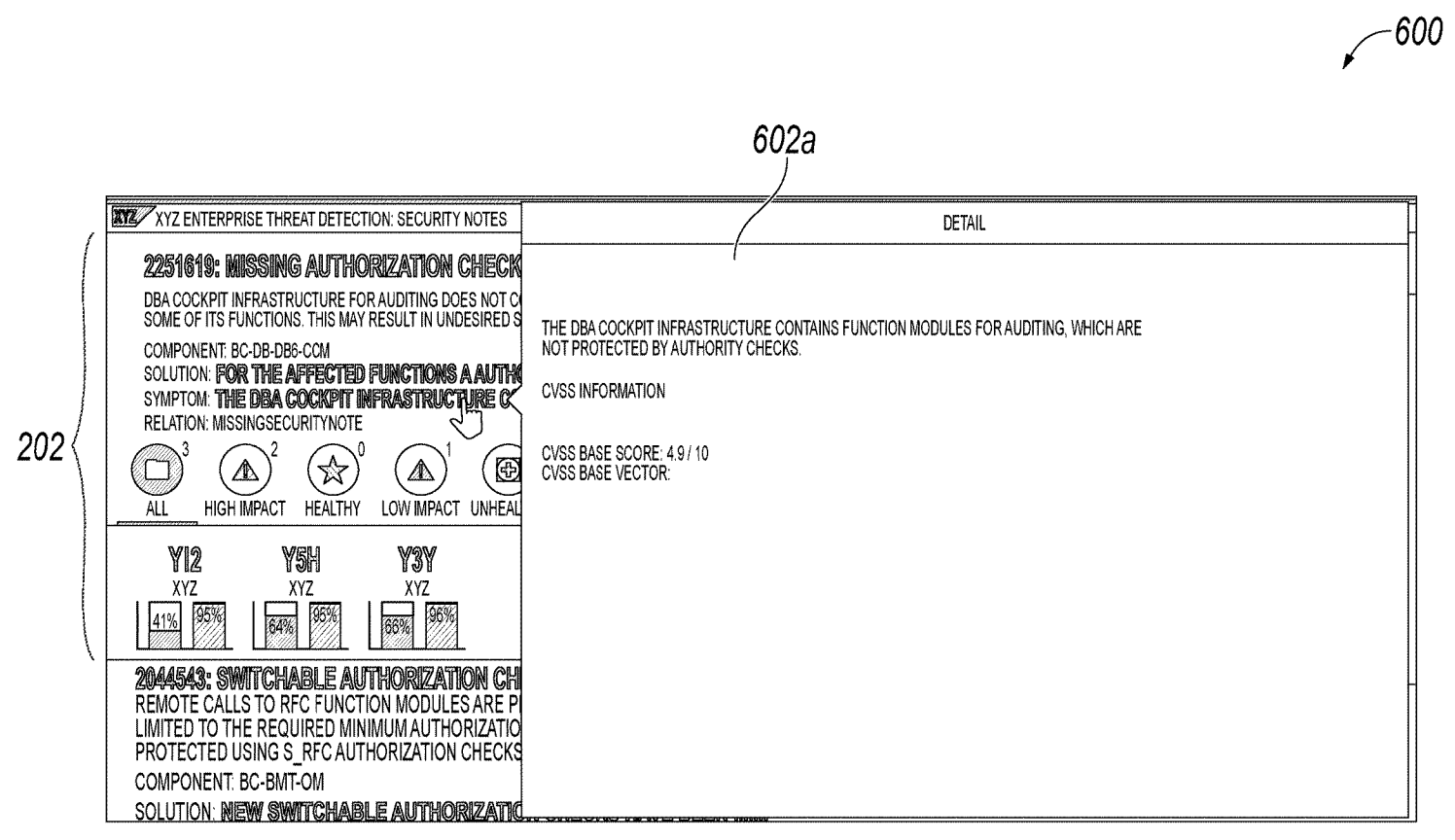
Figure 6B:

FIGS. 6A-6B illustrate screenshots of an example symptom detail GUI 600 in relation to the ETD Security Notes GUI 200, according to an implementation. If an IT administrator selects the selectable symptom link 212 (refer to FIG. 2), GUI 600 is rendered and provides symptom information associated with the security note 202. For example, detail 602a in FIG. 6A states that "The DBA cockpit infrastructure contains function modules for auditing, which are not protected by authority checks" and CVSS information (such as, CVSS base score of 4.9/10). Referring to FIG. 6B, in some implementations, scrolling down in detail GUI 600 provides additional symptom data 602b (for example, data associated with CIA).

Figure 7A:
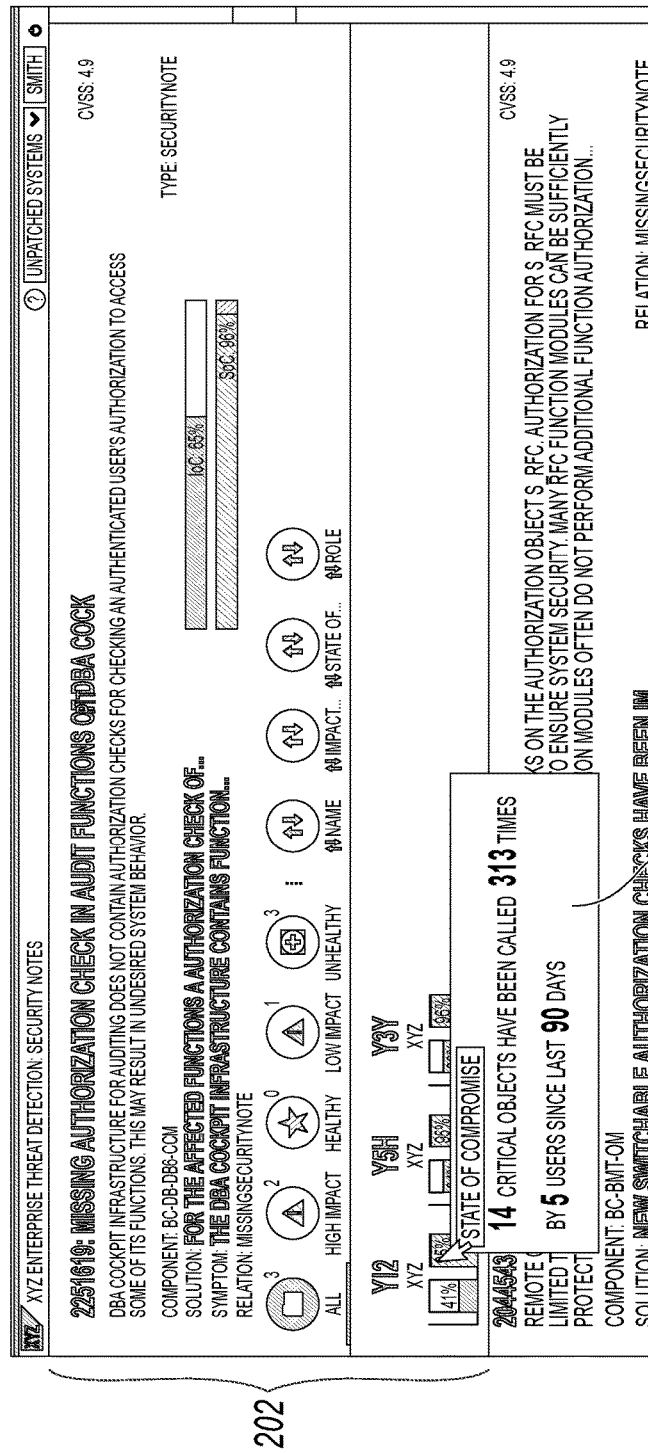
FIG. 7A is an illustration of a screenshot of an example SoC value pop-up dialog in relation to the ETD Security Notes GUI, according to an implementation.

FIG. 7A is an illustration of a screenshot of an example SoC value pop-up dialog 700a in relation to the ETD Security Notes GUI 200, according to an implementation. As illustrated, if a SoC indicator (for example, 406a of FIG. 4A) for a particular system is hovered over, selected, or similar, the SoC value pop-up dialog 700a is rendered with data 702a. In some implementations, data 702a provides how many critical objects have been called and how many times the critical objects have been called. The number of users making the calls and the timeframe the calls were made is also provided. As illustrated, for example, data 702a states "14 Critical Objects have been called 313 times by 5 users since last 90 days."

Figure 7B:
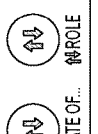
FIG. 7B is an illustration of a screenshot of another example SoC value pop-up dialog in relation to an ETD Security Notes GUI, according to an implementation.

FIG. 7B is an illustration of a screenshot of another example SoC value pop-up dialog 700b in relation to an ETD Security Notes GUI 200, according to an implementation. In contrast to FIG. 7A, the SoC values for all systems related to the identified component are 0%. Accordingly, the SoC value pop-up dialog associated with system "CR9" states that "Critical objects have not been exploited since last 90 days"). Note that the aggregated SoC value 704b is also 0%. For a patched component, the SoC value will be 0%. However, the component is not patched (as indicated by the value of GUI element 220), but identified critical objects have not been exploited.

On the occurrence of a potential exploit (event) detected by an ETD pattern, an indicator (not illustrated) can be generated. For example, in some implementations, the indicator can include a reference to the event; a reference to an applicable security note; and a reference to a computing system, user, location of the computing system, terminal of the user, timestamp, and relevant object.

Figure 8:
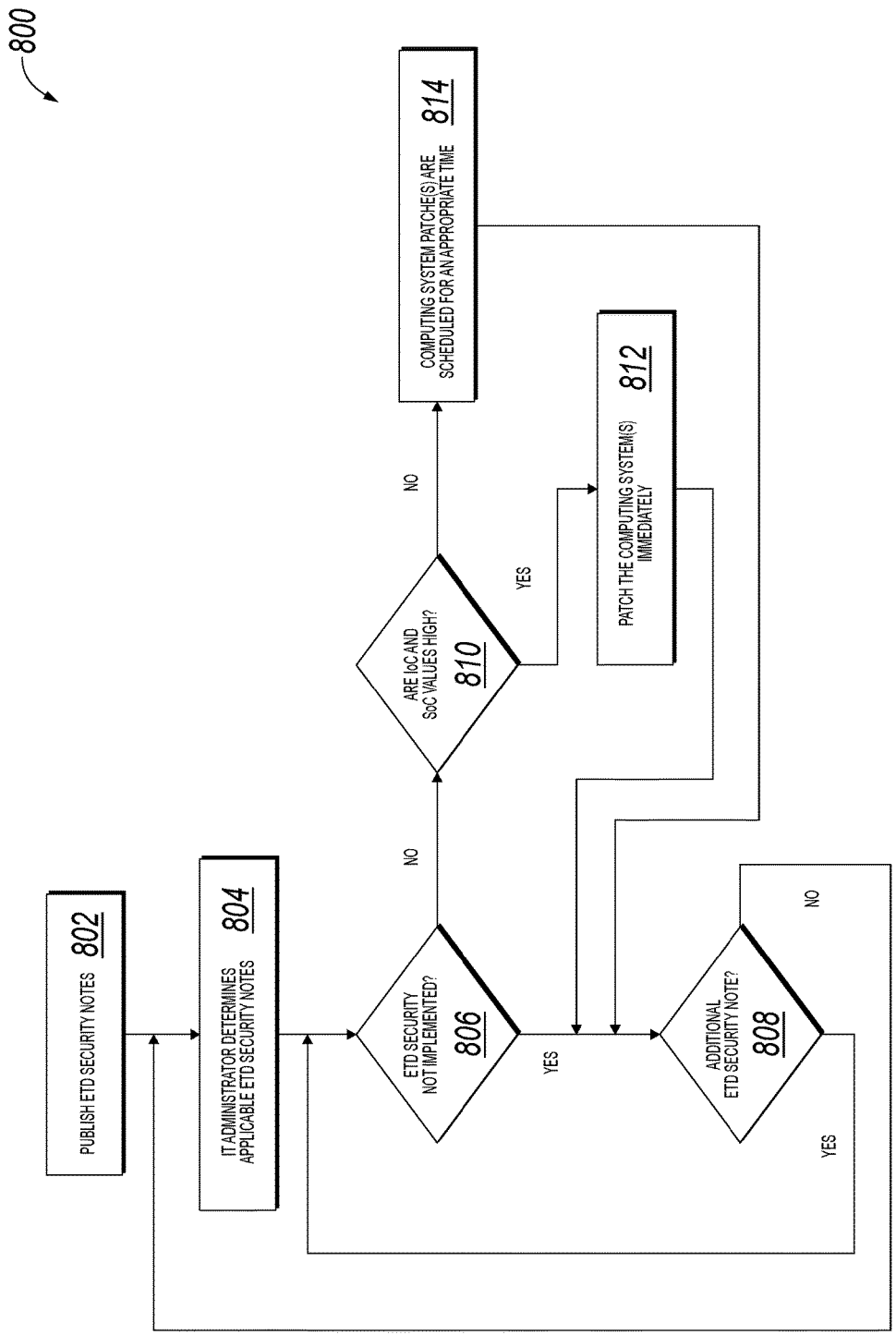
FIG. 8 is a flowchart illustrating an example method for real-time evaluation of impact- and state-of-compromise due to vulnerabilities described in enterprise threat detection (ETD) security notes.

FIG. 8 is a flowchart illustrating an example method 800 for evaluation in real-time of impact- and state-of-compromise due to vulnerabilities described in ETD security notes, according to an implementation. For clarity of presentation, the description that follows generally describes method 800 in the context of the other figures in this description. However, it will be understood that method 800 may be performed, for example, by any suitable system, environment, software, and hardware, or a combination of systems, environments, software, and hardware, as appropriate. In some implementations, various steps of method 800 can be run in parallel, in combination, in loops, or in any order.

At 802, ETD security notes are published and received at a computer data store (for example, a database). For example, ETD security notes can be published on a defined schedule (such as, every month) or as needed for a critical security issue. From 802, method 800 proceeds to 804.

At 804, an IT administrator accesses the published ETD security notes in the data store and determines applicability of particular ETD security notes for particular components associated with computing systems in an IT computing landscape. From 804, method 800 proceeds to 806.

At 806, the IT administrator processes the ETD security notes applicable to the IT computing landscape and determines whether a particular applicable ETD security note has been properly implemented in the IT computing landscape. If it is determined that the ETD security note has been properly implemented, method 800 proceeds to 808. If it is determined that the ETD security note has not been properly implemented, method 800 proceeds to 810.

At 808, a determination is made as to whether there are additional applicable ETD security notes to process. If it is determined that there are additional ETD security notes to process, method 800 proceeds back to 806. If it is determined that there are not additional ETD security notes to process, method 800 proceeds back to 804 to determine if new ETD security notes have been published.

At 810, a determination is made as to whether IoC and SoC values associated with the security note are high (for example, the aggregated IoC and SoC values). If it is determined that the IoC and SoC values are high, method 800 proceeds to 812. If it is determined that the IoC and SoC values are not high, method 800 proceeds to 814. In some implementations, the determination at 810 (and patching actions of 812 and 814) can be based on the IoC value, the SoC value, or a combination of both the IoC and SoC values.

At 812, the IT administrator patches the computing system(s) associated with the security note immediately or as soon as reasonably practicable because the IoC and SoC values indicate a critical security risk to the computing systems of the IT computing landscape. From 812, method 800 proceeds back to 808.

At 814, the IT administrator can schedule patching of the computing system(s) associated with the security note based on the ETD security note for an appropriate time because the IoC and SoC values indicate a low security risk to the computing systems of the IT computing landscape. For example, the patching actions can be added to a pre-defined patching schedule and performed according to the schedule. From 814, method 800 proceeds back to 808.

Figure 9:
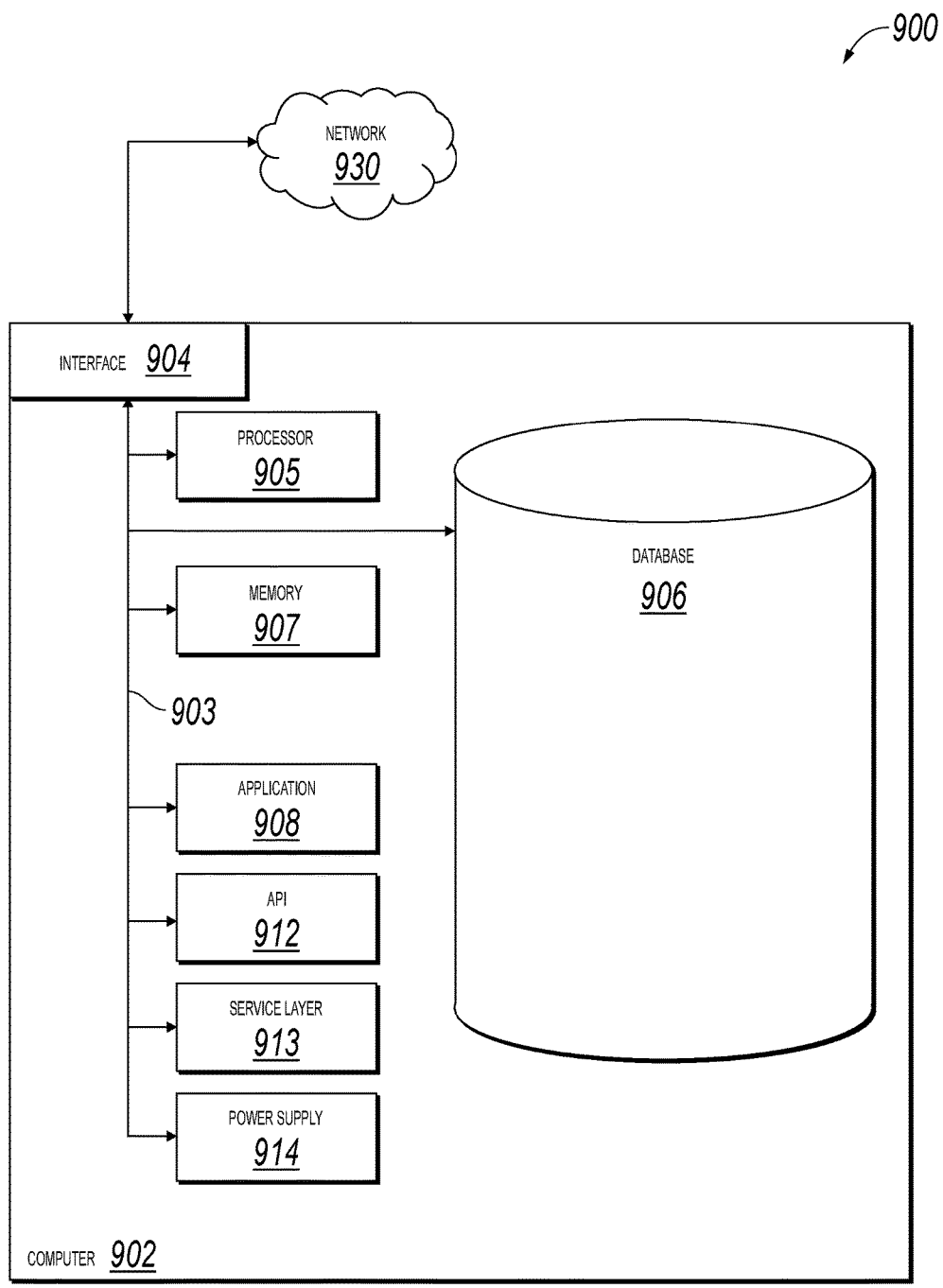
FIG. 9 is a block diagram illustrating an example computer system used to provide computational functionalities associated with described algorithms, methods, functions, processes, flows, and procedures as described in the instant disclosure, according to an implementation.

FIG. 9 is a block diagram illustrating an example computer system 900 used to provide computational functionalities associated with described algorithms, methods, functions, processes, flows, and procedures, as described in the instant disclosure, according to an implementation. The illustrated computer 902 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 902 may comprise a computer that includes an input device, such as a keypad, keyboard, touch screen, or other device that can accept user information, and an output device that conveys information associated with the operation of the computer 902, including digital data, visual, or audio information (or a combination of information), or a graphical user interface (GUI).

The computer 902 can serve in a role as a client, network component, a server, a database or other persistency, or any other component (or a combination of roles) of a computer system for performing the subject matter described in the instant disclosure. The illustrated computer 902 is communicably coupled with a network 930. In some implementations, one or more components of the computer 902 may be configured to operate within environments, including cloud-computing-based, local, global, or other environment (or a combination of environments).

At a high level, the computer 902 is an electronic computing device operable to receive, transmit, process, store, or manage data and information associated with the described subject matter. According to some implementations, the computer 902 may also include or be communicably coupled with an application server, e-mail server, web server, caching server, streaming data server, or other server (or a combination of servers).

The computer 902 can receive requests over network 930 from a client application (for example, executing on another computer 902) and respond to the received requests by processing the received requests using an appropriate software application(s). In addition, requests may also be sent to the computer 902 from internal users (for example, from a command console or by other appropriate access method), external or third-parties, other automated applications, as well as any other appropriate entities, individuals, systems, or computers.

Each of the components of the computer 902 can communicate using a system bus 903. In some implementations, any or all of the components of the computer 902, hardware or software (or a combination of both hardware and software), may interface with each other or the interface 904 (or a combination of both), over the system bus 903 using an application programming interface (API) 912 or a service layer 913 (or a combination of the API 912 and service layer 913). The API 912 may include specifications for routines, data structures, and object classes. The API 912 may be either computer-language independent or dependent and refer to a complete interface, a single function, or even a set of APIs. The service layer 913 provides software services to the computer 902 or other components (whether or not illustrated) that are communicably coupled to the computer 902. The functionality of the computer 902 may be accessible for all service consumers using this service layer. Software services, such as those provided by the service layer 913, provide reusable, defined functionalities through a defined interface. For example, the interface may be software written in JAVA, C++, or other suitable language providing data in extensible markup language (XML) format or other suitable format. While illustrated as an integrated component of the computer 902, alternative implementations may illustrate the API 912 or the service layer 913 as stand-alone components in relation to other components of the computer 902 or other components (whether or not illustrated) that are communicably coupled to the computer 902. Moreover, any or all parts of the API 912 or the service layer 913 may be implemented as child or sub-modules of another software module, enterprise application, or hardware module without departing from the scope of this disclosure.

The computer 902 includes an interface 904. Although illustrated as a single interface 904 in FIG. 9, two or more interfaces 904 may be used according to particular needs, desires, or particular implementations of the computer 902. The interface 904 is used by the computer 902 for communicating with other systems that are connected to the network 930 (whether illustrated or not) in a distributed environment. Generally, the interface 904 comprises logic encoded in software or hardware (or a combination of software and hardware) and is operable to communicate with the network 930. More specifically, the interface 904 may comprise software supporting one or more communication protocols associated with communications such that the network 930 or interface's hardware is operable to communicate physical signals within and outside of the illustrated computer 902.

The computer 902 includes a processor 905. Although illustrated as a single processor 905 in FIG. 9, two or more processors may be used according to particular needs, desires, or particular implementations of the computer 902. Generally, the processor 905 executes instructions and manipulates data to perform the operations of the computer 902 and any algorithms, methods, functions, processes, flows, and procedures as described in the instant disclosure.

The computer 902 also includes a database 906 that can hold data for the computer 902 or other components (or a combination of both) that can be connected to the network 930 (whether illustrated or not). For example, database 906 can be an in-memory, conventional, or other type of database storing data consistent with this disclosure. In some implementations, database 906 can be a combination of two or more different database types (for example, a hybrid in-memory and conventional database) according to particular needs, desires, or particular implementations of the computer 902 and the described functionality. Although illustrated as a single database 906 in FIG. 9, two or more databases (of the same or combination of types) can be used according to particular needs, desires, or particular implementations of the computer 902 and the described functionality. While database 906 is illustrated as an integral component of the computer 902, in alternative implementations, database 906 can be external to the computer 902.

The computer 902 also includes a memory 907 that can hold data for the computer 902 or other components (or a combination of both) that can be connected to the network 930 (whether illustrated or not). For example, memory 907 can be random access memory (RAM), read-only memory (ROM), optical, magnetic, and the like, storing data consistent with this disclosure. In some implementations, memory 907 can be a combination of two or more different types of memory (for example, a combination of RAM and magnetic storage) according to particular needs, desires, or particular implementations of the computer 902 and the described functionality. Although illustrated as a single memory 907 in FIG. 9, two or more memories 907 (of the same or combination of types) can be used according to particular needs, desires, or particular implementations of the computer 902 and the described functionality. While memory 907 is illustrated as an integral component of the computer 902, in alternative implementations, memory 907 can be external to the computer 902.

The application 908 is an algorithmic software engine providing functionality according to particular needs, desires, or particular implementations of the computer 902, particularly with respect to functionality described in this disclosure. For example, application 908 can serve as one or more components, modules, or applications. Further, although illustrated as a single application 908, the application 908 may be implemented as multiple applications 908 on the computer 902. In addition, although illustrated as integral to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion or management circuits (including recharging, standby, or other power management functionality). In some implementations, the power-supply 914 can include a power plug to allow the computer 902 to be plugged into a wall socket or other power source to, for example, power the computer 902 or recharge a rechargeable battery.

There may be any number of computers 902 associated with, or external to, a computer system containing computer 902, each computer 902 communicating over network 930. Further, the term "client," "user," and other appropriate terminology may be used interchangeably, as appropriate, without departing from the scope of this disclosure. Moreover, this disclosure contemplates that many users may use one computer 902, or that one user may use multiple computers 902.

Described implementations of the subject matter can include one or more features, alone or in combination.

For example, in a first implementation, a computer-implemented method, comprising: accessing published enterprise threat detection (ETD) security notes in a computer data store; determining applicability of the published ETD security notes for an information technology computing (IT) landscape; determining that a particular applicable ETD security note has not yet been implemented in the IT computing landscape; analyzing aggregated impact of compromise (IoC) and state of compromise (SoC) values associated with the published ETD security note; and performing a computing system patching action based on the aggregated IoC and SoC values.

The foregoing and other described implementations can each, optionally, include one or more of the following features:

A first feature, combinable with any of the following features, wherein the ETD security notes are published according to a define timeframe or as-needed based on the criticality of a security issue.

A second feature, combinable with any of the previous or following features, wherein each particular ETD security note is applicable to a particular component associated with one or more computing systems in the information technology landscape.

A third feature, combinable with any of the previous or following features, wherein the analyzed aggregated IoC and SoC values are calculated based on individual IoC and SoC values, respectively, associated with each computing system in the IT computing landscape containing the particular component.

A fourth feature, combinable with any of the previous or following features, wherein the computing system patching action is performed immediately or as soon as reasonably practicable because the IoC and SoC values indicate a critical security risk to the computing systems of the IT computing landscape.

A fifth feature, combinable with any of the previous or following features, wherein the computing system patching action is scheduled for an appropriate time because the IoC and SoC values indicate a low security risk to the computing systems of the IT computing landscape.

A sixth feature, combinable with any of the previous or following features, further comprising: processing another applicable ETD security note based on a determination that additional applicable ETD security notes are available; or determining whether new ETD security notes have been published based on a determination that no additional applicable ETD security notes are available to process.

In a second implementation, a non-transitory, computer-readable medium storing one or more instructions executable by a computer system to perform operations comprising: accessing published enterprise threat detection (ETD) security notes in a computer data store; determining applicability of the published ETD security notes for an information technology computing (IT) landscape; determining that a particular applicable ETD security note has not yet been implemented in the IT computing landscape; analyzing aggregated impact of compromise (IoC) and state of compromise (SoC) values associated with the published ETD security note; and performing a computing system patching action based on the aggregated IoC and SoC values.

The foregoing and other described implementations can each, optionally, include one or more of the following features:

A first feature, combinable with any of the following features, wherein the ETD security notes are published according to a define timeframe or as-needed based on the criticality of a security issue.

A second feature, combinable with any of the previous or following features, wherein each particular ETD security note is applicable to a particular component associated with one or more computing systems in the information technology landscape.

A third feature, combinable with any of the previous or following features, wherein the analyzed aggregated IoC and SoC values are calculated based on individual IoC and SoC values, respectively, associated with each computing system in the IT computing landscape containing the particular component.

A fourth feature, combinable with any of the previous or following features, wherein the computing system patching action is performed immediately or as soon as reasonably practicable because the IoC and SoC values indicate a critical security risk to the computing systems of the IT computing landscape.

A fifth feature, combinable with any of the previous or following features, wherein the computing system patching action is scheduled for an appropriate time because the IoC and SoC values indicate a low security risk to the computing systems of the IT computing landscape.

A sixth feature, combinable with any of the previous or following features, further comprising one or more instructions to: process another applicable ETD security note based on a determination that additional applicable ETD security notes are available; or determine whether new ETD security notes have been published based on a determination that no additional applicable ETD security notes are available to process.

In a third implementation, a computer-implemented system, comprising: a computer memory; and a hardware processor interoperably coupled with the computer memory and configured to perform operations comprising: accessing published enterprise threat detection (ETD) security notes in a computer data store; determining applicability of the published ETD security notes for an information technology computing (IT) landscape; determining that a particular applicable ETD security note has not yet been implemented in the IT computing landscape; analyzing aggregated impact of compromise (IoC) and state of compromise (SoC) values associated with the published ETD security note; and performing a computing system patching action based on the aggregated IoC and SoC values.

The foregoing and other described implementations can each, optionally, include one or more of the following features:

A first feature, combinable with any of the following features, wherein the ETD security notes are published according to a define timeframe or as-needed based on the criticality of a security issue.

A second feature, combinable with any of the previous or following features, wherein each particular ETD security note is applicable to a particular component associated with one or more computing systems in the information technology landscape.

A third feature, combinable with any of the previous or following features, wherein the analyzed aggregated IoC and SoC values are calculated based on individual IoC and SoC values, respectively, associated with each computing system in the IT computing landscape containing the particular component.

A fourth feature, combinable with any of the previous or following features, wherein the computing system patching action is performed immediately or as soon as reasonably practicable because the IoC and SoC values indicate a critical security risk to the computing systems of the IT computing landscape.

A fifth feature, combinable with any of the previous or following features, wherein the computing system patching action is scheduled for an appropriate time because the IoC and SoC values indicate a low security risk to the computing systems of the IT computing landscape.

A sixth feature, combinable with any of the previous or following features, further configured to: process another applicable ETD security note based on a determination that additional applicable ETD security notes are available; or determine whether new ETD security notes have been published based on a determination that no additional applicable ETD security notes are available to process.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    accessing published enterprise threat detection (ETD) security notes in a computer data store;
    determining applicability of the published ETD security notes for an information technology computing (IT) landscape;
    determining that a particular applicable ETD security note has not yet been implemented in the IT computing landscape;
    analyzing aggregated impact of compromise (IoC) and state of compromise (SoC) values associated with the published ETD security note; and
    performing a computing system patching action based on the aggregated IoC and SoC values.

2. The computer-implemented method of claim 1, wherein the ETD security notes are published according to a define timeframe or as-needed based on the criticality of a security issue.

3. The computer-implemented method of claim 1, wherein each particular ETD security note is applicable to a particular component associated with one or more computing systems in the information technology landscape.

4. The computer-implemented method of claim 3, wherein the analyzed aggregated IoC and SoC values are calculated based on individual IoC and SoC values, respectively, associated with each computing system in the IT computing landscape containing the particular component.

5. The computer-implemented method of claim 1, wherein the computing system patching action is performed immediately or as soon as reasonably practicable because the IoC and SoC values indicate a critical security risk to the computing systems of the IT computing landscape.

6. The computer-implemented method of claim 1, wherein the computing system patching action is scheduled for an appropriate time because the IoC and SoC values indicate a low security risk to the computing systems of the IT computing landscape.

7. The computer-implemented method of claim 1, further comprising:
    processing another applicable ETD security note based on a determination that additional applicable ETD security notes are available; or
    determining whether new ETD security notes have been published based on a determination that no additional applicable ETD security notes are available to process.

8. A non-transitory, computer-readable medium storing one or more instructions executable by a computer system to perform operations comprising:
    accessing published enterprise threat detection (ETD) security notes in a computer data store;
    determining applicability of the published ETD security notes for an information technology computing (IT) landscape;
    determining that a particular applicable ETD security note has not yet been implemented in the IT computing landscape;
    analyzing aggregated impact of compromise (IoC) and state of compromise (SoC) values associated with the published ETD security note; and
    performing a computing system patching action based on the aggregated IoC and SoC values.

9. The non-transitory, computer-readable medium of claim 8, wherein the ETD security notes are published according to a define timeframe or as-needed based on the criticality of a security issue.

10. The non-transitory, computer-readable medium of claim 8, wherein each particular ETD security note is applicable to a particular component associated with one or more computing systems in the information technology landscape.

11. The non-transitory, computer-readable medium of claim 10, wherein the analyzed aggregated IoC and SoC values are calculated based on individual IoC and SoC values, respectively, associated with each computing system in the IT computing landscape containing the particular component.

12. The non-transitory, computer-readable medium of claim 8, wherein the computing system patching action is performed immediately or as soon as reasonably practicable because the IoC and SoC values indicate a critical security risk to the computing systems of the IT computing landscape.

13. The non-transitory, computer-readable medium of claim 8, wherein the computing system patching action is scheduled for an appropriate time because the IoC and SoC values indicate a low security risk to the computing systems of the IT computing landscape.

14. The non-transitory, computer-readable medium of claim 8, further comprising one or more instructions to:
    process another applicable ETD security note based on a determination that additional applicable ETD security notes are available; or
    determine whether new ETD security notes have been published based on a determination that no additional applicable ETD security notes are available to process.

15. A computer-implemented system, comprising:
    a computer memory; and
    a hardware processor interoperably coupled with the computer memory and configured to perform operations comprising:
        accessing published enterprise threat detection (ETD) security notes in a computer data store;
        determining applicability of the published ETD security notes for an information technology computing (IT) landscape;
        determining that a particular applicable ETD security note has not yet been implemented in the IT computing landscape;
        analyzing aggregated impact of compromise (IoC) and state of compromise (SoC) values associated with the published ETD security note; and
        performing a computing system patching action based on the aggregated IoC and SoC values.

16. The computer-implemented system of claim 15, wherein the ETD security notes are published according to a define timeframe or as-needed based on the criticality of a security issue.

17. The computer-implemented system of claim 15, wherein each particular ETD security note is applicable to a particular component associated with one or more computing systems in the information technology landscape.

18. The computer-implemented system of claim 17, wherein the analyzed aggregated IoC and SoC values are calculated based on individual IoC and SoC values, respectively, associated with each computing system in the IT computing landscape containing the particular component.

19. The computer-implemented system of claim 15, wherein:
- the computing system patching action is performed immediately or as soon as reasonably practicable because the IoC and SoC values indicate a critical security risk to the computing systems of the IT computing landscape; or
- the computing system patching action is scheduled for an appropriate time because the IoC and SoC values indicate a low security risk to the computing systems of the IT computing landscape.

20. The computer-implemented system of claim 15, further configured to:
- process another applicable ETD security note based on a determination that additional applicable ETD security notes are available; or
- determine whether new ETD security notes have been published based on a determination that no additional applicable ETD security notes are available to process.

\* \* \* \* \*